(12) United States Patent
He et al.

(10) Patent No.: US 8,494,053 B2
(45) Date of Patent: Jul. 23, 2013

(54) METHOD AND APPARATUS OF TEMPORAL FILTERING FOR SIDE INFORMATION INTERPOLATION AND EXTRAPOLATION IN WYNER-ZIV VIDEO COMPRESSION SYSTEMS

(75) Inventors: Dake He, Yorktown Heights, NY (US); Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1610 days.

(21) Appl. No.: 11/619,567

(22) Filed: Jan. 3, 2007

(65) Prior Publication Data
US 2008/0159391 A1 Jul. 3, 2008

(51) Int. Cl.
*H04N 11/02* (2006.01)

(52) U.S. Cl.
USPC ...................................................... 375/240.16

(58) Field of Classification Search
USPC ...................................................... 375/240.16
See application file for complete search history.

(56) References Cited

U.S. PATENT DOCUMENTS

| 5,089,887 | A | * | 2/1992 | Robert et al. | 348/699 |
| 5,134,480 | A | * | 7/1992 | Wang et al. | 348/620 |
| 5,517,245 | A | * | 5/1996 | Kondo et al. | 348/392.1 |
| 5,557,341 | A | * | 9/1996 | Weiss et al. | 348/699 |
| 5,657,349 | A | * | 8/1997 | Sugiyama | 375/232 |
| 5,682,438 | A | * | 10/1997 | Kojima et al. | 382/107 |
| 5,949,919 | A | | 9/1999 | Chen | |
| 6,058,143 | A | | 5/2000 | Golin | |
| 6,285,715 | B1 | | 9/2001 | Ozcelik et al. | |
| 6,375,567 | B1 | | 4/2002 | Acres | |
| 2003/0198399 | A1 | * | 10/2003 | Atkins | 382/261 |
| 2005/0213663 | A1 | * | 9/2005 | Aoyama et al. | 375/240.16 |
| 2005/0281334 | A1 | * | 12/2005 | Walker et al. | 375/240.16 |

OTHER PUBLICATIONS

Wedi, et al., "Motion and Aliasing-Compensated Prediction for Hybrid Video Coding" IEEE, Transactions on Circuits and Systems for Video Technology, vol. 13, No. 7, Jul. 2003, pp. 577-586.
Thomas Wedi, "Adapative Interpolation Filter for Motion Compensated Hybrid Video Coding", Proc. Picture Coding Symposium (PCS 2001), Seoul Korea, Apr. 2001, pp. 1-4.
Rohit Puri, et al., "Prism: A New Robust Video Coding Architecture Based on Distributed Compression Principles", pp. 1-10, 2007.
Qiang Peng, et al., "Block Based Temporal Error Concealment for Video Packet Using Motion Vector Extrapolation", 2002 IEEE, Supported by Science and Technology Development Plan Project in Railway Ministry, pp. 10-14.

(Continued)

*Primary Examiner* — Sath V Perungavoor
*Assistant Examiner* — Jeffery Williams
(74) *Attorney, Agent, or Firm* — Daniel P. Morris; McGinn IP Law Group, PLLC (57) ABSTRACT

A method (and system) for video coding includes receiving a first reference frame having a first pixel value at a first pixel position, a second reference frame having a second pixel value at a second pixel position, and a third reference frame having a third pixel value at a third pixel position, determining a first motion vector between the first pixel position and the second pixel position, determining a second motion vector between the second pixel position and the third pixel position, and determining a fourth pixel value for a fourth frame based upon a linear or nonlinear combination of the first pixel value, the second pixel value, and the third pixel value.

26 Claims, 8 Drawing Sheets

OTHER PUBLICATIONS

Shin-ichiro Koto, et al., "Adapptive Bi-Predictive Video Coding Using Temporal Extrapolation", 2003 IEEE, Multimedia Laboratory, Corporate Research & Development Center, pp. 1-4.

Anne Aaron, et al., "Towards Practical Wyner-Ziv Coding of Video", 2003 IEEE, Information Systems Laboratory, Department of Electrical Engineering, Stanford University Stanford, CA, pp. 869-872.

Sibel Yaman, et al., "A Low-Complexity Video Encoder with Decoder Motion Estimator", 2004 IEEE, Center for Signal and Image Processing Georgia Institute of Technology, Atlanta, GA, pp. 157-160.

* cited by examiner

000
METHOD AND APPARATUS OF TEMPORAL FILTERING FOR SIDE INFORMATION INTERPOLATION AND EXTRAPOLATION IN WYNER-ZIV VIDEO COMPRESSION SYSTEMS

The invention described herein was made in the performance of work under NASA Contract No. NNS05AA75C and is subject to the provisions of Section 305 of the National Aeronautics and Space Act of 1958 (42 U.S.C. 2457).

BACKGROUND OF THE INVENTION

1. Field of the Invention

The present invention generally relates to methods and apparatuses for signal interpolation and extrapolation. More specifically, the present invention relates to temporal filtering for generating improved side information for video coding systems that rely upon Wyner-Ziv principles.

2. Description of the Related Art

Extrapolation and interpolation of a visual signal, such as image, video, and graphics, have been widely used in various contexts, including, but not limited to: video-coding, transcoding, error concealment, pre-processing, and interactive rendering.

For instance, techniques for extrapolating and interpolating in video-coding applications have been described by Aaron et al., in *Toward Practical Wyner-Ziv Coding of Video*, PROC. IEEE INT. CONF ON IMAGE PROCESSING, pp. 869-872, Barcelona, Spain, Spet. (2003), Puri et al., *PRISM: A New Robust Video Coding Architecture based on Distributed Compression Principles*, ALLERTON CONFERENCE ON COMMUNICATION, CONTROL AND COMPUTING, (2002), and Yaman et al., in *A Low-Complexity Video Encoder with Decoder Motion Estimation*, Proc. ICASSP, Montreal, Canada, (2004).

Techniques for extrapolating and interpolating in transcoding applications have been described by U.S. Pat. No. 6,058,143 issued on May 2, 2000 to Golin for "Motion Vector Extrapolation for Transcoding Video Sequences."

Further, techniques for extrapolating and interpolating in error concealment for video decoding or post-processing applications have been described by Peng et al., in *Block-Based Temporal Error Concealment for Video Packet Using Motion Vector Extrapolation*, International Conf on Communications, Circuits, Systems and West Sino Expo, pp. 10-14, Jun. 29-Jul. 1, (2002) and by U.S. Pat. No. 6,285,715 issued on Sep. 4, 2001, to Ozcelik for "Methods and Apparatus for Error Concealment While Decoding a Coded Video Bit Stream."

Conventional visual signal extrapolation and interpolation methods used in video coding, trans-coding, error concealment, video decoding, and post-processing applications are based on motion information and are, therefore, referred to as "motion-based" extrapolation and interpolation methods, respectively.

Conventional non-motion-based extrapolation/interpolation methods are used in other applications, including a model-based view extrapolation method for virtual reality rendering, a feature extrapolation method for pre-compression, and a video fading scene prediction method. For example, a model-based view extrapolation method is described by U.S. Pat. No. 6,375,567 issued on Apr. 23, 2002 to Acres for "Model-Based View Extrapolation for Interactive Virtual Reality Systems." A feature extrapolation method is described by U.S. Pat. No. 5,949,919 issued on Sep. 7, 1999 to Chen for "Precompression Extrapolation Method." Likewise a video fading scene prediction is described by Koto et al., in *Adaptive Bi-Predictive Video Coding Temporal Extrapolation*, ICIP (2003).

One example of a motion-based extrapolation/interpolation method is the side information generation process used in a Wyner-Ziv video coding technique. A typical Wyner-Ziv video coding system includes a video encoder and a video decoder. The video encoder is a low complexity and, therefore, a low power consumption encoder. The computational heavy signal processing tasks, such as motion estimation, are performed by the decoder.

To achieve high coding efficiency, the Wyner-Ziv decoder exploits the statistical correlation between the source and side information, which is only available at the decoder, in decoding the received signals to reconstruct the video. The source is the video signal (e.g., a picture) to be encoded at the encoder and transmitted to the decoder for decoding, and the side information can be viewed as a prediction or essentially an estimate of the decoded picture.

The performance of a Wyner-Ziv video coding system depends heavily on the fidelity and reliability of the side information. The closer the side information is to the source, the better the performance of the system. Therefore, the method and apparatus used by the decoder to generate the side information plays a crucial role in a Wyner-Ziv video coding system.

Typically, the decoder first performs motion estimation on previously reconstructed pictures to generate a set of motion vectors and then uses such motion vectors to generate an estimate of the picture currently being decoded by extrapolation or interpolation. This estimate is used as the side information by the decoder for decoding and reconstructing the current picture.

Figure 1:
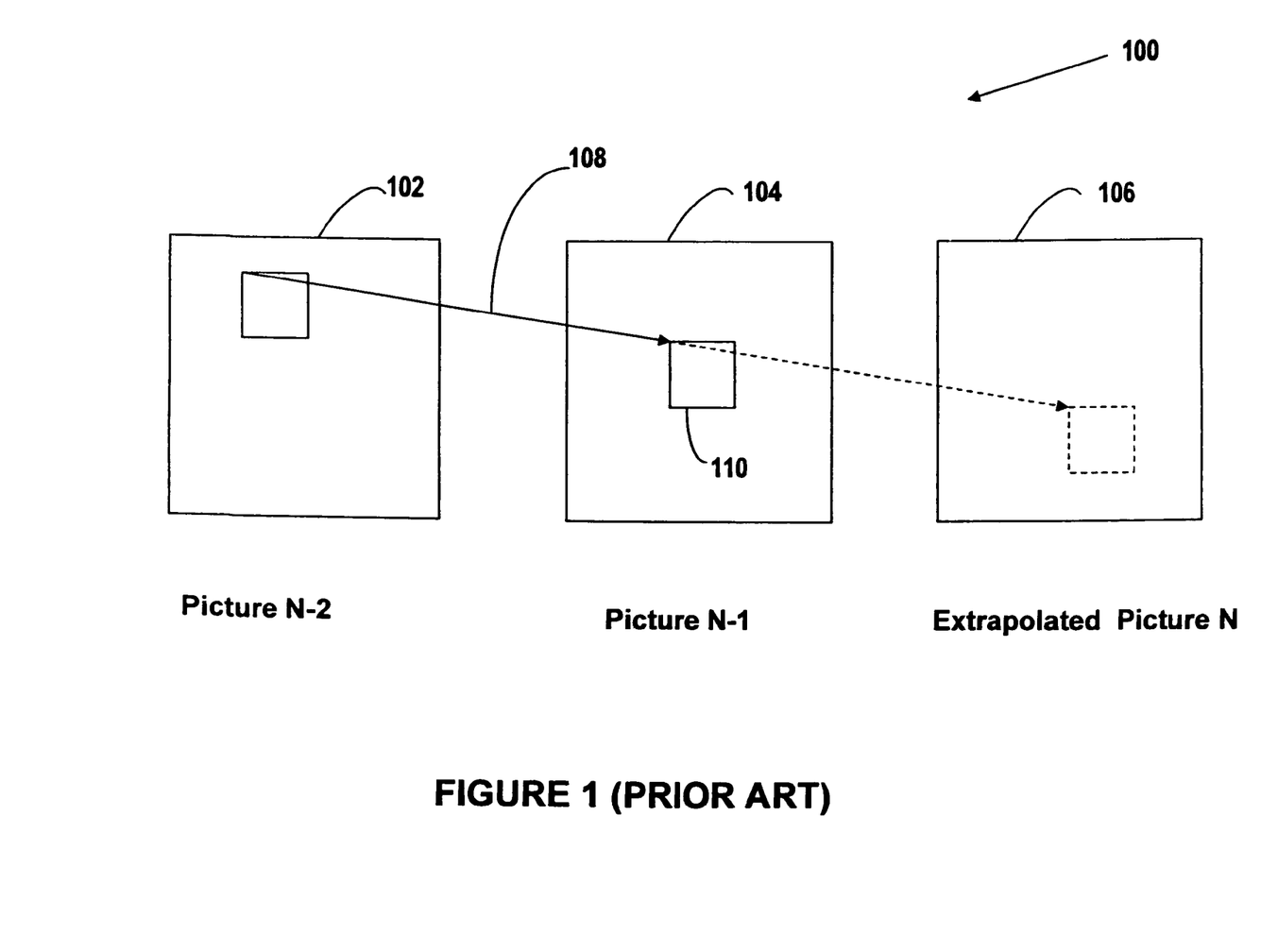
FIG. 1 illustrates a conventional motion-based linear temporal extrapolation method 100.

FIG. 1 is a diagram illustrating a conventional motion-based temporal extrapolation process 100. Specifically, in order to extrapolate a Picture N 106, motion estimation is first performed on at least two previously reconstructed pictures, namely, Pictures N−2 102 and N−1 104, to generate a motion vector 108 for each pixel or block of pixels 110 in Picture N−1 104, which is indicative of the motion of the pixel or the block of pixels between Picture N−1 104 and Picture N−2 102 (i.e., a "reverse" motion). This is done for all pixels or all blocks of pixels to provide a set of motion vectors.

Then, the set of motion vectors are manipulated according to a predetermined function that is based upon an underlying motion model or assumption. For example, if a constant linear displacement motion model is used for the predetermined function, then the motion vectors are reversed, and the pixel or the block of pixels associated with the motion vectors is extrapolated (i.e., mapped) from its location in Picture N−1 104 to a location defined by the reversed motion vectors in an estimate of the extrapolated Picture N 106.

Note that the motion vector 108 may also be constructed for each pixel or a block of pixels in Picture N−2 102 to indicate the motion between Picture N−2 102 and Picture N−1 104. In such a case, the motion vector 108 should then be shifted, and the pixel or the block of pixels associated with the motion vector should be extrapolated or mapped from its location in Picture N−1 104 to a location defined by the scaled motion vector in an estimate of the extrapolated Picture N 106.

The motion-based temporal extrapolation process as described above, therefore, extrapolates the current Picture N 106, after all the pixels or the blocks of pixels 110 in Picture N−1 104 (or Picture N−2 102) are mapped.

Figure 2:
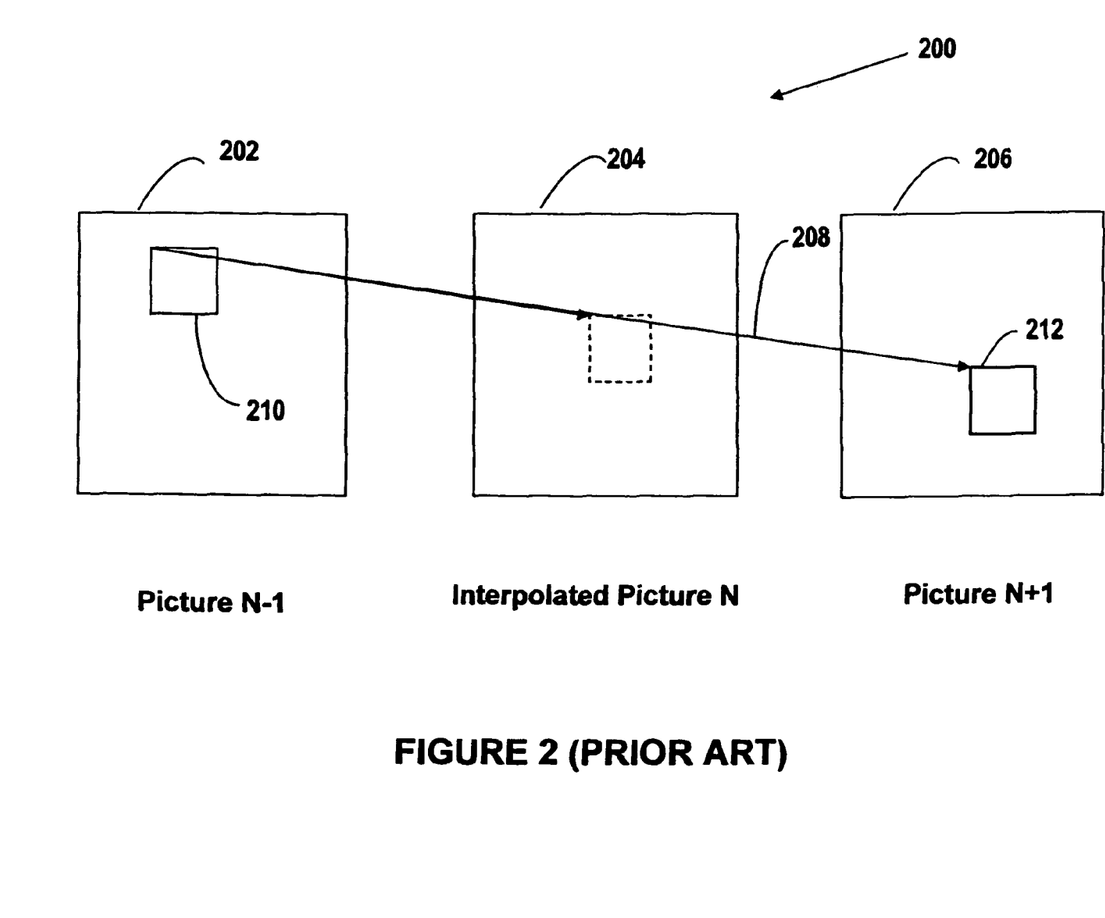
FIG. 2 illustrates a conventional motion-based linear temporal interpolation method 200.

FIG. 2 illustrates a conventional motion-based temporal interpolation process 200. Motion estimation is first performed on at least two previously reconstructed pictures, namely, Pictures N−1 202 and N+1 206, to obtain a motion vector 208 for each pixel or a block of pixels 210 in Picture N−1 202, which is indicative of the motion of the pixel or the block of pixels 210 from Picture N−1 202 to Picture N+1 206.

Then, the motion vector 208 is scaled down (e.g., by a factor of 2) based on an underlying assumption of a constant linear displacement motion model, and the pixels or the blocks of pixels 210 associated with the motion vectors 208 are interpolated from their locations in Picture N−1 202 and/or N+1 206 to a location defined by the scaled motion vector in an estimate of the current Picture N 204.

Note that the motion vector 208 can also be constructed for each pixel or a block of pixels 212 in Picture N+1 206 to indicate the motion between Picture N+1 206 and Picture N−1 202 to provide a set of motion vectors. In such an incident, the set of motion vectors should also be scaled down (e.g., by a factor of 2), and the pixels or the blocks of pixels associated with the set of motion vectors should be interpolated from their locations in Picture N−1 202 and/or Picture N+1 206 to a location defined by the scaled set of motion vectors in an estimate of the current Picture N 204.

The motion-based temporal interpolation process as described above interpolates the current Picture N 204, after all the pixels or the blocks of pixels in Picture N+1 206 (or Picture N−1 202) are mapped.

Figure 3:
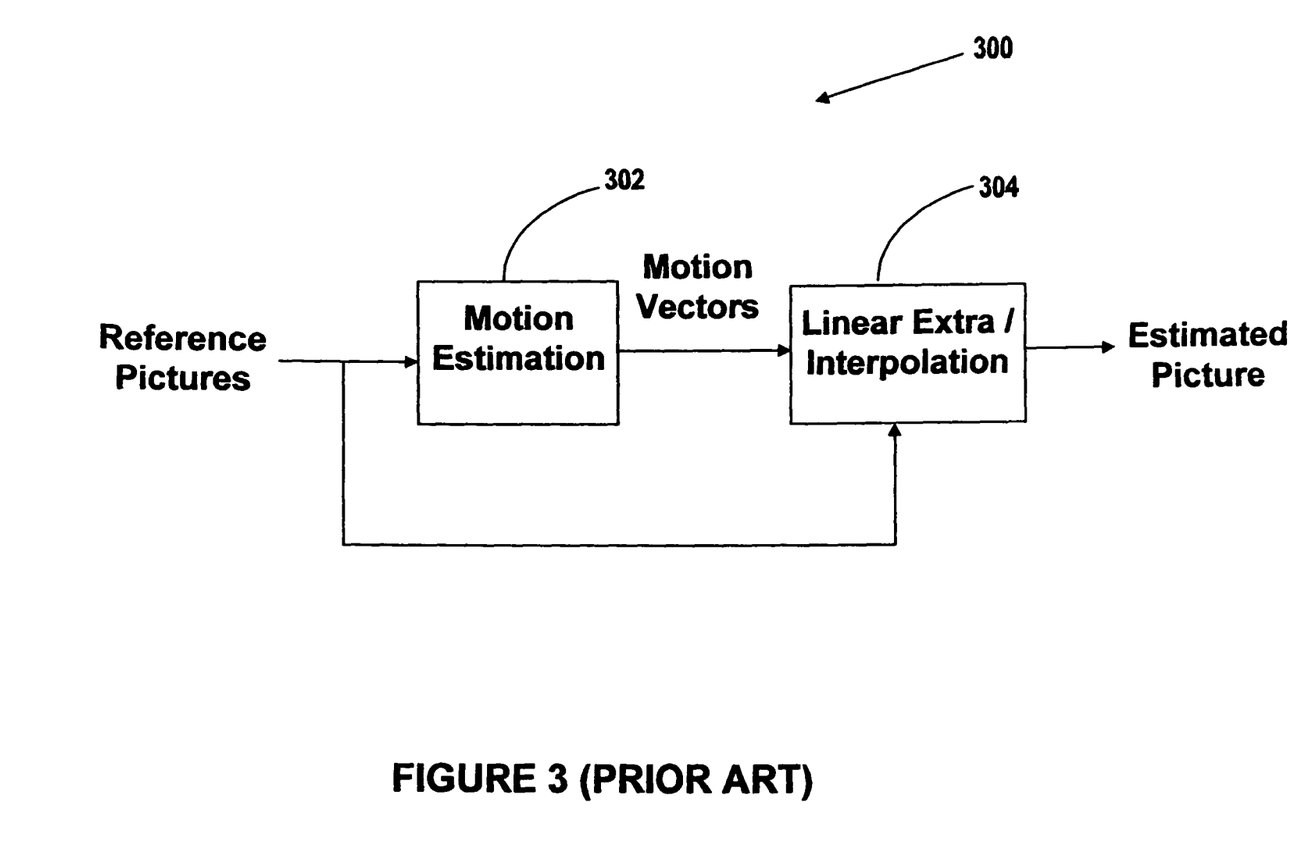
FIG. 3 illustrates a conventional motion-based extrapolation and interpolation apparatus 300.

FIG. 3 is a flowchart 30 that describes the operation of a conventional motion-based extrapolation and interpolation system. Specifically, the system 300 includes a motion estimation unit 302 and a linear extrapolation/interpolation unit 304. The motion estimation unit 302 receives picture signals from previously reconstructed pictures and generates a set of motion vectors. For example, referring to FIG. 2, the motion estimation unit 302 receives reference pictures N−1 202 and N+1 206 and determines a motion vector 208 between block 210 and corresponding block 212.

Then, the linear extrapolation/interpolation unit 304 receives the motion vectors and the reference pictures to generate an estimate of the picture in accordance with an underlying motion model. For example, referring to FIG. 2, the linear extrapolation/interpolation unit 304 receives the reference pictures N−1 202 and N+1 206 and the motion vector 208 from the motion estimation unit 302 and generates the interpolated picture N 204.

The conventional extrapolation and interpolation methods and systems have several serious drawbacks. The conventional methods and systems rely upon an assumption that the pixel values do not change. However, this assumption is often invalid because the pixel values may change due to changes in lighting conditions, contrast, fading, and the like.

Indeed, no matter the accuracy of the underlying model for these conventional methods and systems, there is almost always some noise in the video signal, which means that the prediction error is usually not zero.

Further, these conventional systems and methods only have limited capability to correct and/or reduce the errors caused by the reference frame with low fidelity.

Therefore, it is desirable to provide a system and method for visual signal extrapolation and interpolation that does not have the drawbacks of the conventional motion-based extrapolation and interpolation methods.

SUMMARY OF THE INVENTION

In view of the foregoing and other exemplary problems, drawbacks, and disadvantages of the conventional methods and structures, an exemplary feature of the present invention provides a method and structure in which a filtering process determines pixel values.

In a first exemplary aspect of the present invention, a method for video coding includes receiving a first reference frame having a first pixel value at a first pixel position, a second reference frame having a second pixel value at a second pixel position, and a third reference frame having a third pixel value at a third pixel position, determining a first motion vector between the first pixel position and the second pixel position, determining a second motion vector between the second pixel position and the third pixel position, and determining a fourth pixel value for a fourth frame based upon a linear combination of the first pixel value, the second pixel value, and the third pixel value.

In a second exemplary aspect of the present invention, a system for video coding includes a motion estimation unit that receives a first reference frame having a first pixel value at a first pixel position, a second reference frame having a second pixel value at a second pixel position, and a third reference frame having a third pixel value at a third pixel position, and that determines a first motion vector between the first pixel position and the second pixel position, and a second motion vector between the second pixel position and the third pixel position, a coefficients generator that generates filter coefficients, a temporal filter that determines a fourth pixel value for a fourth frame based upon a linear combination of the first pixel value, the second pixel value, and the third pixel value, and an extrapolation/interpolation device that outputs an estimated picture based upon the fourth pixel value from the temporal filter.

In a third exemplary aspect of the present invention, a program embodied in a computer readable medium executable by a digital processing unit includes instructions for receiving a first reference frame having a first pixel value at a first pixel position, a second reference frame having a second pixel value at a second pixel position, and a third reference frame having a third pixel value at a third pixel position, instructions for determining a first motion vector between the first pixel position and the second pixel position, instructions for determining a second motion vector between the second pixel position and the third pixel position, and instructions for determining a fourth pixel value for a fourth frame based upon a linear combination of the first pixel value, the second pixel value, and the third pixel value.

In an exemplary embodiment of the present invention, a stationary filtering process determines the estimated pixel values. The parameters of the filter may be predetermined constants.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 4-8, there are shown exemplary embodiments of the methods and structures of the present invention.

Figure 4:
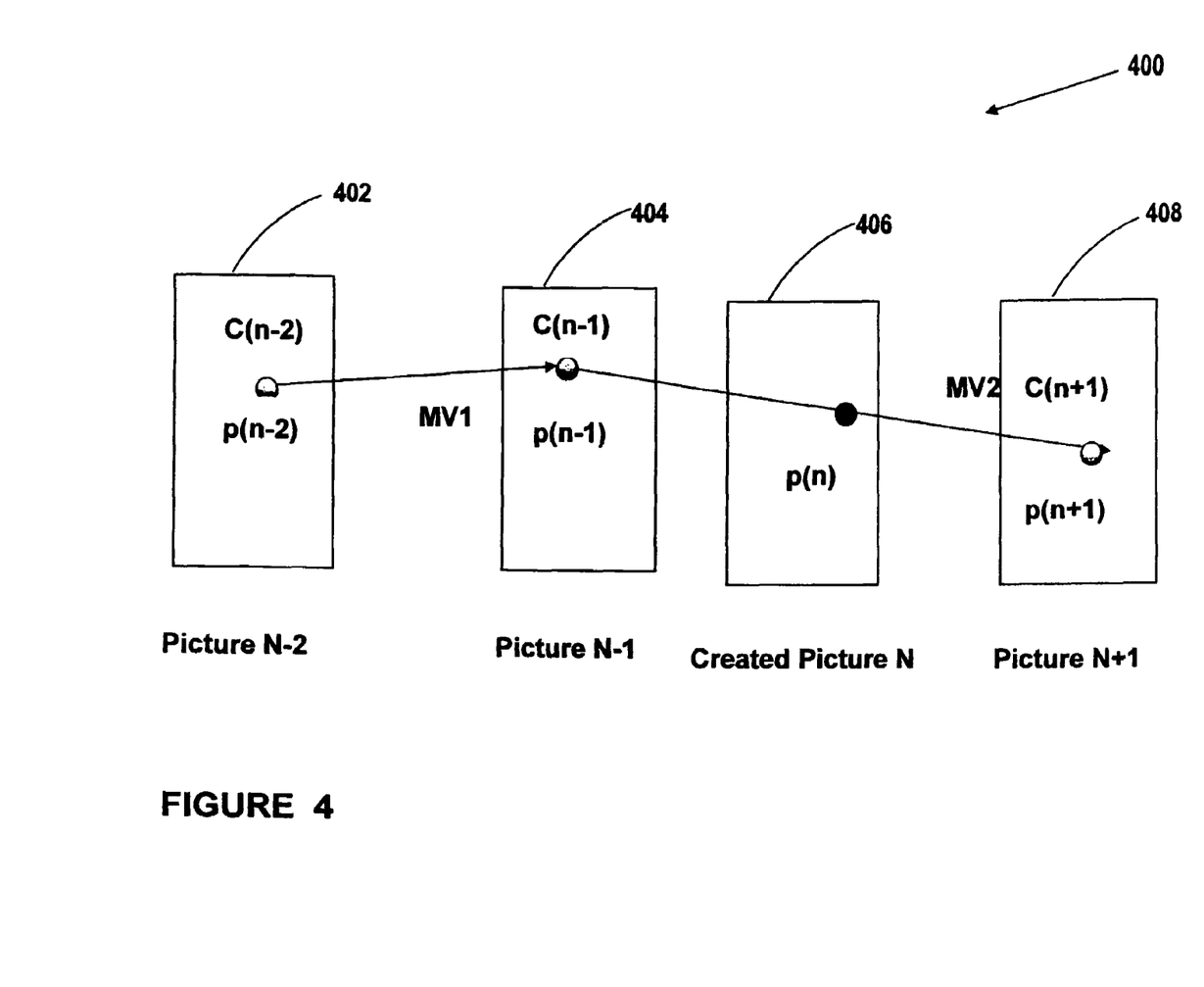
FIG. 4 illustrates an exemplary visual signal extrapolation or interpolation method 400 using temporal filtering in accordance with the present invention.

FIG. 4 illustrates the application of an exemplary embodiment of the present invention. This exemplary embodiment receives three reference frames, which include Picture N−2 402, Picture N−1 404, and Picture N+1 408.

This exemplary embodiment performs motion estimation between Picture N−2 402 and Picture N−1 404 to provide a first motion vector MV1.

Next, this exemplary embodiment performs motion estimation between Picture N−1 404 and Picture N+1 408 to provide a second motion vector MV2.

Next, this exemplary embodiment does not predict the values of pixels in Picture N as has conventionally been done, rather, this exemplary embodiment predicts new pixel values for Picture N using a temporal filtering process.

Let $p_N(x,y)$ be the pixel value to be predicted at position (x,y) in Picture N. The new pixel value $p_N(x,y)$ is obtained by a temporal filtering process of the pixel values from the reference frames according to the following equation:

$$p_N(x,y) = c_{N-2} p_{N-2}(x_2, y_2) + c_{N-1} p_{N-1}(x_1, y_1) + c_{N+1} p_{N+1}(x_0, y_0) \quad (1)$$

where:

$p_{N-2}(x_2, y_2)$ is the pixel value at the location $(x_2, y_2)$ from which the first motion vector MV1 in Picture N−2 402 originates;

$p_{N-1}(x_1, y_1)$ is the pixel value at the location $(x_1, y_1)$ from which motion vector MV2 originates in Picture N−1 404;

$p_{N+1}(x_0, y_0)$ is the pixel value at the location $(x_0, y_0)$ pointed by the second motion vector MV2 in Picture N+1 408;

$c_{N-2}$ is a filter coefficient for Picture N−2;

$c_{N-1}$ is a filter coefficient for Picture N−1; and $c_{N+1}$ is a filter coefficient for Picture N+1.

Figure 5:
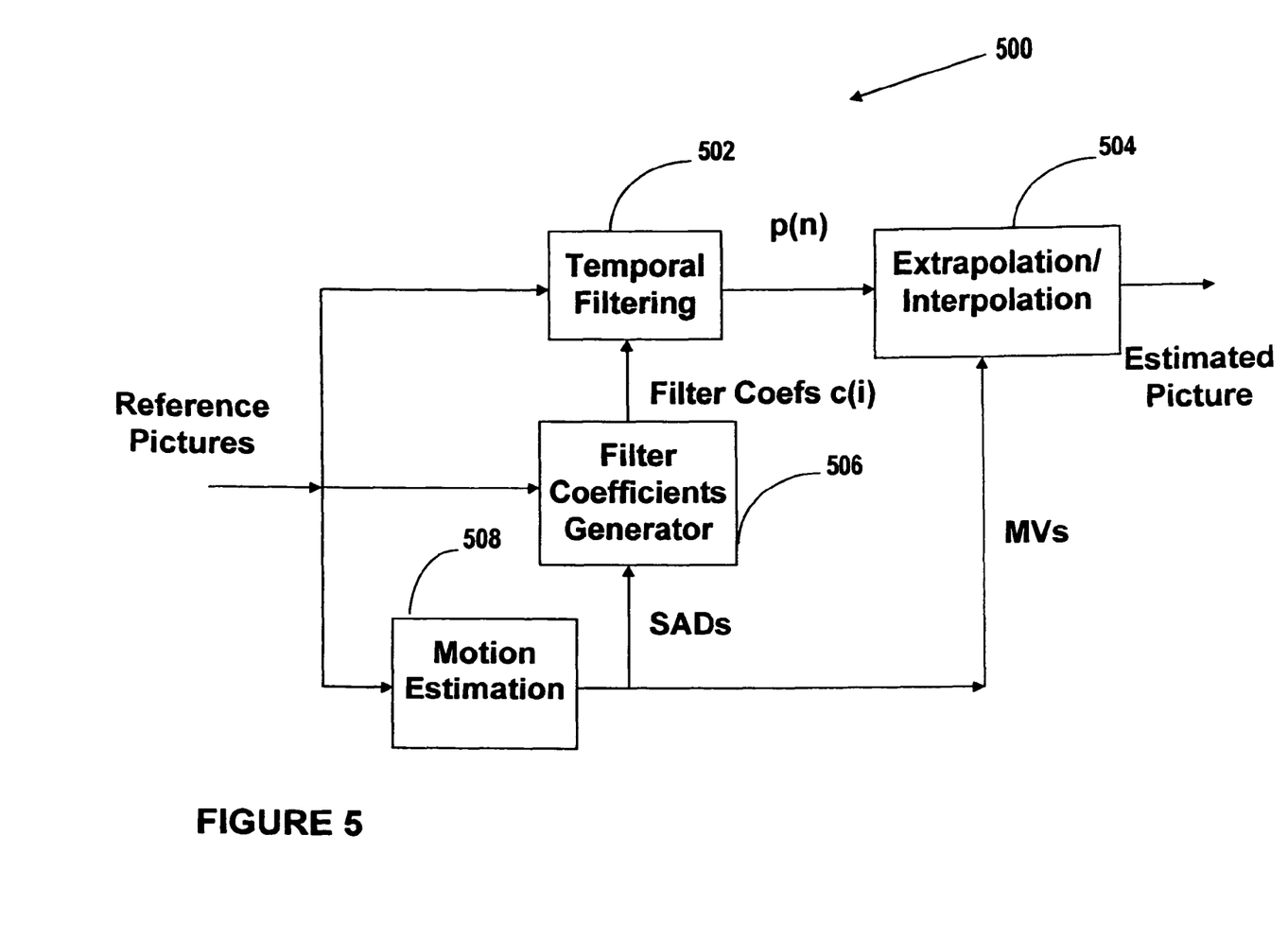
FIG. 5 illustrates an exemplary visual signal extrapolation or interpolation apparatus 500 that uses temporal filtering in accordance with an exemplary embodiment of the present invention.

FIG. 5 illustrates an exemplary embodiment of a system 500 for video coding in accordance with the present invention. The system 500 includes a motion estimation unit 508, a temporal filtering unit 502, a filter coefficient generator 506, and an extrapolation/interpolation unit 504.

The filter coefficient generator 506 generates the filter coefficients, such as $c_{N-2}$, $c_{N-1}$, and $c_{N+1}$ for the application illustrated in FIG. 4. These filter coefficients may be constants or may be adaptively adjusted. For example, the filter coefficients may be adjusted on a pixel-by-pixel basis or a block-by-block basis depending upon the information from the reference pictures and the motion estimation results.

In the exemplary embodiment of FIG. 5, the filter coefficients generator 506 generates coefficients using the sum of the absolute differences (SADs), which are based upon the motion estimation errors from the motion estimation unit 508.

The SADs are obtained by taking the absolute value of the differences between each of the pixels in the current block.

The extrapolation/interpolation unit 504 receives the value of the pixel p(n) as calculated by the temporal filtering unit 502 in accordance with Equation (1) and the motion vectors MVs from the motion estimation unit 508 and outputs the estimated picture.

One of ordinary skill in the art understands that the filter coefficients may be generated by any number of different methods and may even be constants and still practice the invention. The following is merely an example of one way of determining the filtering coefficients.

In one exemplary embodiment, the filter is invariant with a set of predetermined constant coefficients. One such example is $\{c_{N-2}, c_{N-1}, c_{N-1}\} = \{1/7, 3/7, 3/7\}$.

In another exemplary embodiment the filter is adaptive in both the tap numbers and filter coefficients. An example to adapt the filter is described as follows. Let $SAD_1$ and $SAD_2$ be the Sum of the Absolute Differences associated with the first motion vector $MV_1$ and the second motion vector $MV_2$ as shown in FIG. 4, respectively. The $SAD_i$, i=1, 2 are obtained during the motion estimation to find $MV_1$ and $MV_2$; They are calculated over a block B of pixels in Picture N−1 and the corresponding block B of pixels in Picture N−2 or Picture N+1 pointed by $MV_1$ or $MV_2$, i.e:

$$SAD_1 = \sum_{\{(x_1,y_1) \in B, (x_2,y_2) \in B'\}} abs(p_{N-1}(x_1, y_1) - p_{N-2}(x_2, y_2)); \quad (2)$$

$$SAD_2 = \sum_{\{(x_1,y_1) \in B, (x_0,y_0) \in B'\}} abs(p_{N-1}(x_1, y_1) - p_{N+1}(x_0, y_0)). \quad (3)$$

Where the function abs(.) calculates the absolute value of its argument. The tap number and coefficients of the filter are adapted according to $SAD_1$ and $SAD_2$, for example, the ratio $$\frac{SAD_1}{SAD_2}.$$

$$\{c_{N-2}, c_{N-1}, c_{N-1}\} = \{0, 0.5, 0.5\}, \text{ if } \frac{SAD_1}{SAD_2} \geq T_1; \quad (4)$$

$$\{c_{N-2}, c_{N-1}, c_{N-1}\} = \{-a, 1.0+a, 0\}, \text{ if } \frac{SAD_1}{SAD_2} \leq T_2; \quad (5)$$

$$\{c_{N-2}, c_{N-1}, c_{N-1}\} = \{b/d, (d-b)/2d, (d-b)/2d\}, \text{ otherwise}, \quad (6)$$

where $0 < a < 1.0$, $b > 0$, $d > 0$, and $b/d \ll 1$; $T_1$ and $T_2$ are thresholds.

In each case above, the location (x, y) of the estimated pixel $p_N(x, y)$ in Picture N is determined by using $MV_1$ and $MV_2$ accordingly.

The reference pictures described above may be previously reconstructed pictures that can be used for constructing an estimate picture via extrapolation or interpolation.

The inputs to the temporal filter may be the pixels in the reference pictures to which the motion vectors point.

Further, the number of the filter taps may depend on the number of the reference pictures. As illustrated above, the coefficients of the filter may be predetermined constants or may be adaptive, for instance, based upon the motion compensated prediction errors according to another embodiment of the invention.

Figure 6:
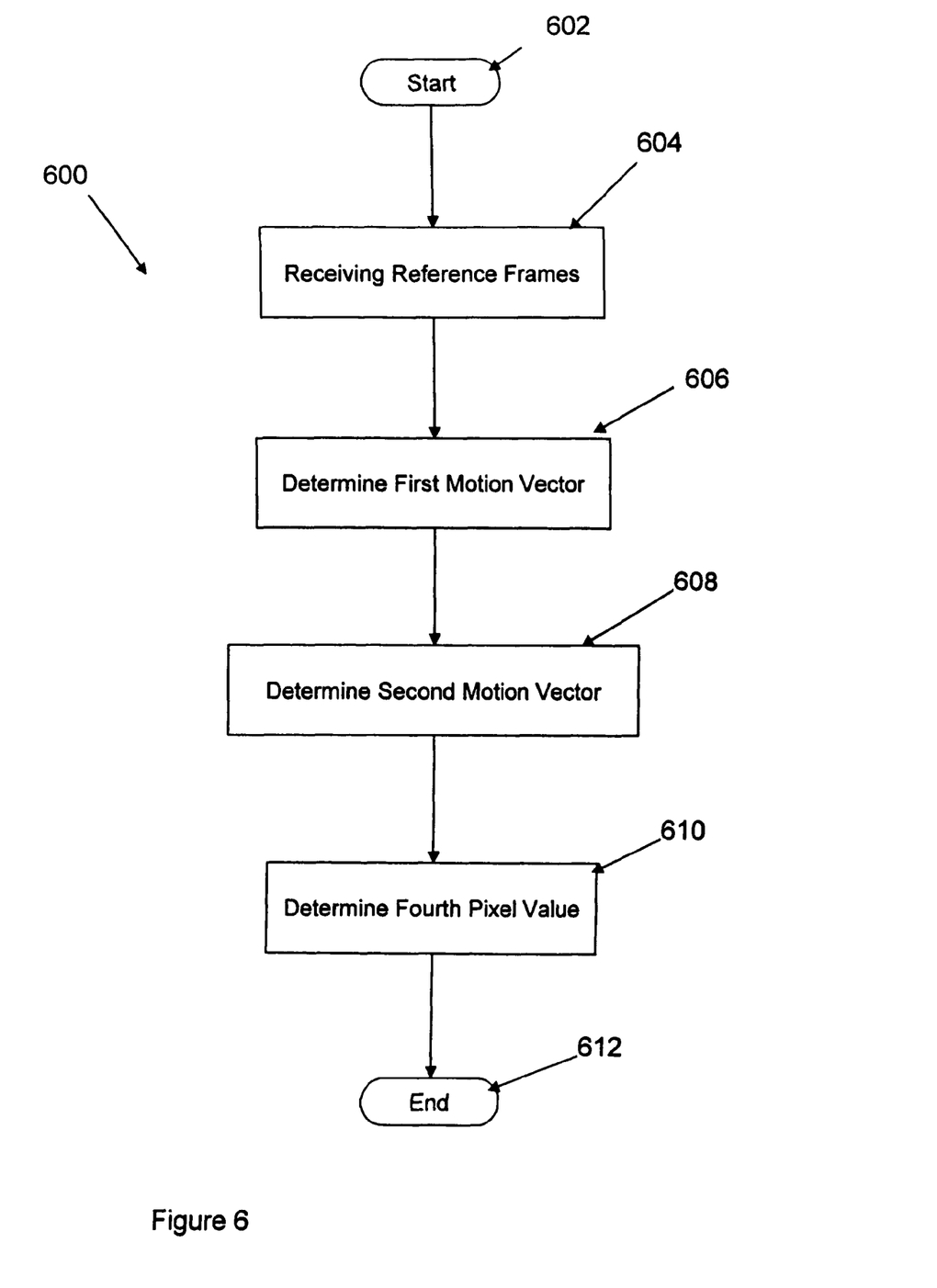
FIG. 6 is a flowchart 600 that illustrates an exemplary method in accordance with the present invention.

FIG. 6 is a flowchart 600 that illustrates an exemplary method in accordance with the present invention. The flowchart starts at step 602 and continues to step 604. At step 604, the method receives a first reference frame having a first pixel value at a first pixel position, a second reference frame having a second pixel value at a second pixel position, and a third reference frame having a third pixel value at a third pixel position. The method continues to step 606 where the method determines a first motion vector between the first pixel position and the second pixel position. The method then continues to step 608 where the method determines a second motion vector between the second pixel position and the third pixel position. Next, the method continues to step 610 where the method determines a fourth pixel value for a fourth frame based upon a linear combination of the first pixel value, the second pixel value, and the third pixel value. The method ends at step 612.

Figure 7:
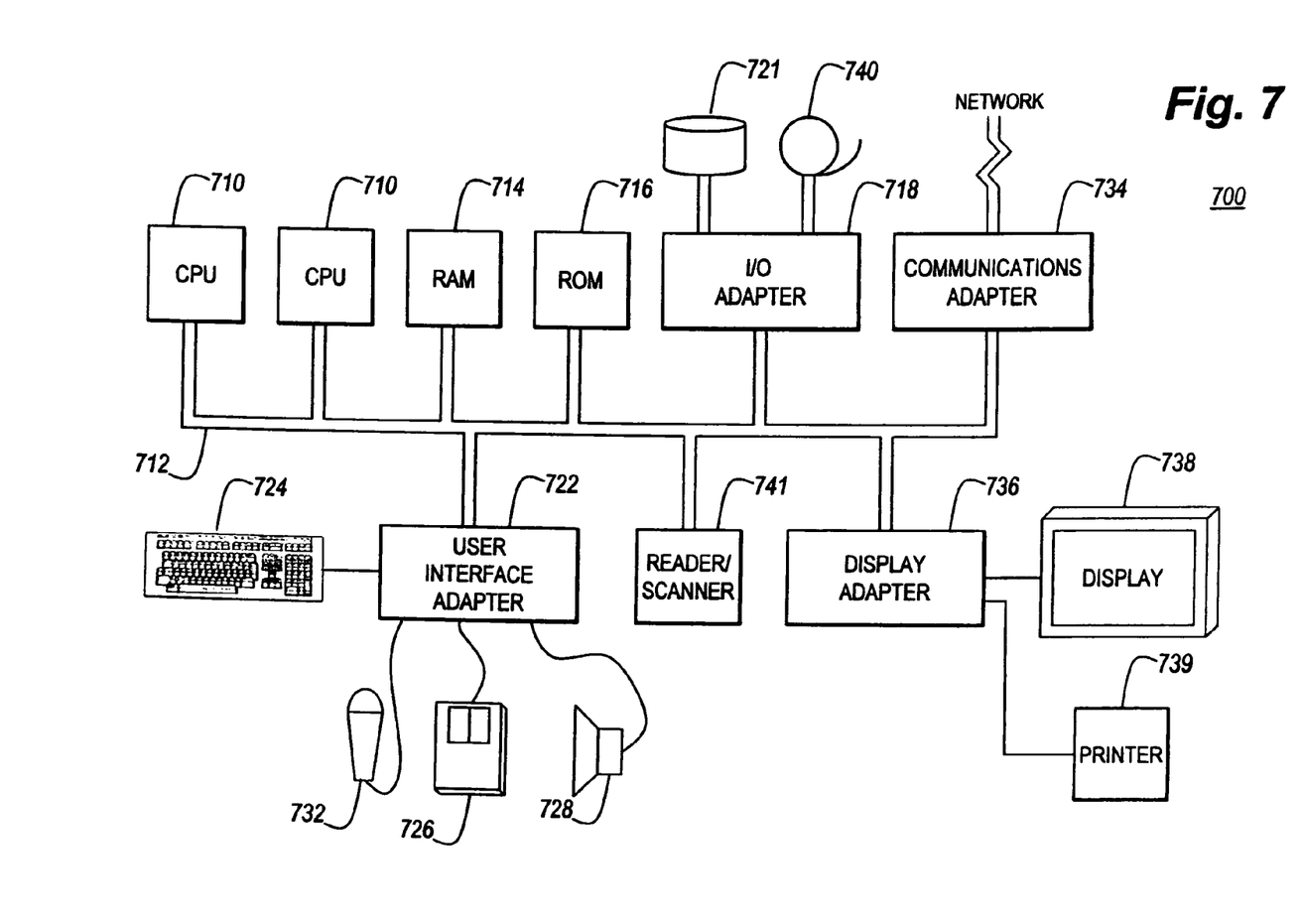
FIG. 7 illustrates an exemplary hardware/information handling system 700 for the present invention.

Referring now to FIG. 7, system 700 illustrates a typical hardware configuration that may be used for implementing an exemplary embodiment of the present invention. The configuration may have preferably at least one processor or central processing unit (CPU) 710. The CPUs 702 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including a program embodied in a computer readable medium executable by a digital processor. Such a method may be implemented, for example, by operating the CPU 710 to execute a sequence of machine-readable instructions. These instructions may reside in various types of signal bearing media. Thus, this aspect of the present invention is directed to a program embodied in a computer readable medium executable by a digital processor incorporating the CPU 710 and hardware above, to perform a method in accordance with the present invention.

This signal-bearing media may include, for example, a RAM (not shown) contained within the CPU 710, as represented by the fast-access storage for example.

Figure 8:
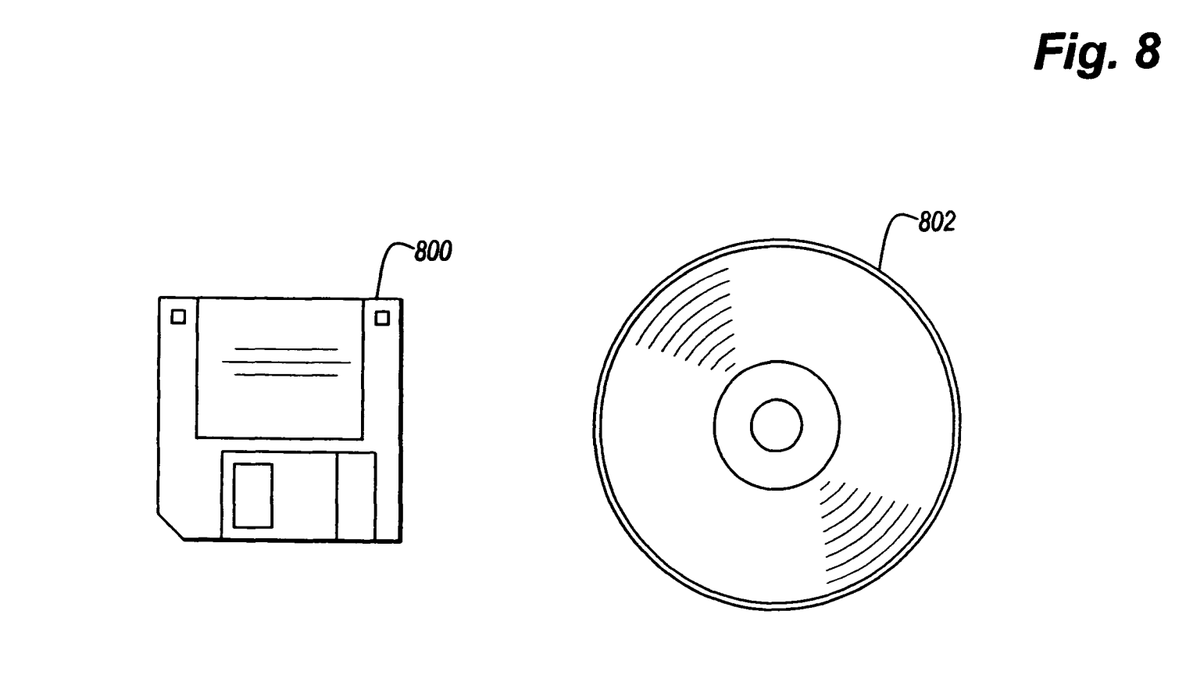
FIG. 8 illustrates signal bearing media 800 and 802 (e.g., storage medium) for embodying a program that is executable by a digital processing unit according to the present invention.

Alternatively, the instructions may be contained in another signal-bearing media, such as a magnetic data storage diskette 800, CD-ROM 802, or the like as illustrated by FIG. 8. These instructions may be directly or indirectly accessible by the CPU 710.

Whether contained in the computer server/CPU 710, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may comprise software object code, complied from a language such as "C," etc.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

What is claimed is:

1. A method of video coding, comprising:
in a video coding system:
receiving a first reference frame having a first pixel value at a first pixel position, a second reference frame having a second pixel value at a second pixel position, and a third reference frame having a third pixel value at a third pixel position;
performing motion estimation to determine a first motion vector between said first pixel position and said second pixel position, and to determine a second motion vector between said second pixel position and said third pixel position;
generating plural coefficients based upon a sum of absolute differences between pixel values associated with the first motion vector and a sum of absolute differences between pixel values associated with the second motion vector; and
determining a fourth pixel value for a fourth frame based upon a linear combination of the plural coefficients and said first pixel value, said second pixel value, and said third pixel value.

2. The method of claim 1, wherein the determining of the fourth pixel position for said fourth pixel value is based upon said first motion vector and said second motion vector.

3. The method of claim 1, wherein said first reference frame is chronologically prior to said fourth frame and said second reference frame is one of chronologically prior to said fourth frame and after said fourth frame.

4. The method of claim 1, wherein said third reference frame is chronologically after said fourth frame.

5. The method of claim 1, wherein said linear combination is described by a polynomial including the plural coefficients.

6. The method of claim 5, wherein said plural coefficients are based upon the sum of absolute value of the differences between pixel values within a block in a corresponding one of said reference frames.

7. The method of claim 5, wherein said plural coefficients are adaptively adjusted on one of a pixel-by-pixel basis and a block-by-block basis.

8. The method of claim 1, wherein said determining said fourth pixel value is defined by:

$$p_N(x,y) = c_{N-2} p_{N-2}(x_2, y_2) + c_{N-1} p_{N-1}(x_1, y_1) + c_{N+1} p_{N+1}(x_0, y_0)$$

where:
$p_{N-2}(x_2, y_2)$ is said first pixel value at said first pixel position $(x_2, y_2)$ in said first reference frame;
$p_{N-1}(x_1, y_1)$ is said second pixel value at said second pixel position $(x_1, y_1)$ in said second reference frame;
$p_{N+1}(x_0, y_0)$ is said third pixel value at said third pixel position $(x_0, y_0)$ in said third reference frame;

$c_{N-2}$ is a first coefficient for said first reference frame;

$c_{N-1}$ is a second coefficient for said second reference frame; and $c_{N+1}$ is a third coefficient for said third reference frame.

9. The method of claim 1, wherein said determining said fourth pixel value is defined by a linear combination of $p_{N-2}(x_2,y_2)$, $p_{N-1}(x_1,y_1)$, and $p_{N+1}(x_0,y_0)$ where:

$p_{N-2}(x_2, y_2)$ is said first pixel value at said first pixel position $(x_2, y_2)$ in said first reference frame;

$p_{N-1}(x_1,y_1)$ is said second pixel value at said second pixel position $(x_1, y_1)$ in said second reference frame; and $p_{N+1}(x_0, y_0)$ is said third pixel value at said third pixel position $(x_0, y_0)$ in said third reference frame.

10. A system for video coding, comprising:

a motion estimation unit that:

receives a first reference frame having a first pixel value at a first pixel position, a second reference frame having a second pixel value at a second pixel position, and a third reference frame having a third pixel value at a third pixel position; and performs motion estimation to determine a first motion vector between said first pixel position and said second pixel position, and to determine a second motion vector between said second pixel position and said third pixel position;

a filter coefficients generator that generates plural filter coefficients based upon a sum of absolute differences between pixel values associated with the first motion vector and a sum of absolute differences between pixel values associated with the second motion vector;

a temporal filter that determines a fourth pixel value for a fourth frame based upon a linear combination of the plural filter coefficients and said first pixel value, said second pixel value, and said third pixel value; and an extrapolation/interpolation device that outputs an estimated picture based upon the fourth pixel value from said temporal filter.

11. The system of claim 10, wherein said temporal filter determines a fourth pixel position for said fourth pixel value based upon said first motion vector and said second motion vector, wherein said first reference frame is chronologically prior to said fourth frame, and wherein said second reference frame is one of chronologically prior to said fourth frame and after said fourth frame.

12. The system of claim 10, wherein said third reference frame is chronologically after said fourth frame.

13. The system of claim 10, wherein said linear combination is described by a polynomial including the plural coefficients.

14. The system of claim 13, wherein said plural coefficients are based upon the sum of absolute value of the differences between pixel values within a block in a corresponding one of said reference frames.

15. The system of claim 13, wherein said plural coefficients are adaptively adjusted on one of a pixel-by-pixel basis and a block-by-block basis.

16. The system of claim 10, wherein the tap numbers and plural coefficients for said linear combination are adaptive.

17. The system of claim 10, wherein said temporal filter defines said fourth pixel value based upon:

$p_N(x,y)=c_{N-2}p_{N-2}(x_2,y_2)+c_{N-1}p_{N-1}(x_1,y_1)+c_{N+1}p_{N+1}(x_0,y_0)$ where:

$p_{N-2}(x_2,y_2)$ is said first pixel value at said first pixel position $(x_2,y_2)$ in said first reference frame;

$p_{N-1}(x_1,y_1)$ is said second pixel value at said second pixel position $(x_1,y_1)$ in said second reference frame;

$p_{N+1}(x_0,y_0)$ is said third pixel value at said third pixel position $(x_0,y_0)$ in said third reference frame;

$c_{N-2}$ is a first coefficient for said first reference frame;

$c_{N-1}$ is a second coefficient for said second reference frame; and $c_{N+1}$ is a third coefficient for said third reference frame.

18. The system of claim 10, wherein said temporal filter determines said fourth pixel value based upon linear filtering of $p_{N-2}(x_2,y_2)$, $p_{N-1}(x_1,y_1)$, and $p_{N+1}(x_0,y_0)$ where:

$p_{N-2}(x_2, y_2)$ is said first pixel value at said first pixel position $(x_2, y_2)$ in said first reference frame;

$p_{N-1}(x_1, y_1)$ is said second pixel value at said second pixel position $(x_1, y_1)$ in said second reference frame; and $p_{N+1}(x_0, y_0)$ is said third pixel value at said third pixel position $(x_0, y_0)$ in said third reference frame.

19. A non-transitory programmable storage medium tangibly embodying a program of machine-readable instructions executable by a digital processing apparatus to perform the method of claim 1.

20. A system for video coding, comprising:

means for receiving a first reference frame having a first pixel value at a first pixel position, a second reference frame having a second pixel value at a second pixel position, and a third reference frame having a third pixel value at a third pixel position;

means for performing motion estimation to determine a first motion vector between said first pixel position and said second pixel position, and to determine a second motion vector between said second pixel position and said third pixel position;

means for generating plural coefficients based upon a sum of absolute differences between pixel values associated with the first motion vector and a sum of absolute differences between pixel values associated with the second motion vector; and means for determining a fourth pixel value for a fourth frame based upon a linear combination of the plural coefficients and said first pixel value, said second pixel value, and said third pixel value.

21. The method of claim 1, wherein the first pixel value comprises a pixel value at a location in the first reference frame from which the first motion vector originates, the second pixel value comprises a pixel value at a location in the second reference frame from which the second motion vector originates, and the third pixel value comprises a pixel value at a location in the third reference frame which is pointed to by the second motion vector.

22. The method of claim 1, wherein the linear combination comprises first, second and third coefficients which are associated with the first, second and third pixel values, respectively.

23. The method of claim 1, wherein the generating of the plural coefficients is based upon a ratio of a sum of absolute differences between pixel values associated with the first motion vector, to a sum of absolute differences between pixel values associated with the second motion vector.

24. The method of claim 23, wherein the generating of the plural coefficients comprises:

setting the plural coefficients to have first values if the ratio is greater than or equal to a threshold value.

25. The method of claim 24, wherein the generating of the plural coefficients further comprises:

setting the plural coefficients to have second values if the ratio is less than or equal to an other threshold value.

26. The method of claim 1, wherein the performing of the motion estimation is performed after the receiving of the first, second and third reference frames, the generating of the plural coefficients is performed after the performing of the motion estimation, and the determining of the fourth pixel value is performed after the generating of the plural coefficients.

* * * * *